United States Patent
Chen

(10) Patent No.: US 8,050,245 B2
(45) Date of Patent: Nov. 1, 2011

(54) RADIO FREQUENCY MODULE AND WIRELESS COMMUNICATION DEVICE USING THE SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 124 days.

(21) Appl. No.: 12/495,877

(22) Filed: Jul. 1, 2009

(65) Prior Publication Data

US 2010/0271986 A1   Oct. 28, 2010

(30) Foreign Application Priority Data

Apr. 23, 2009   (CN) .......................... 2009 1 0301791

(51) Int. Cl.
*H04H 1/00* (2006.01)
(52) U.S. Cl. ........................................ 370/339; 370/334
(58) Field of Classification Search .................. 370/310, 370/334, 349, 339
See application file for complete search history.

(56) References Cited

U.S. PATENT DOCUMENTS

| | | | |
|---|---|---|---|
| 7,012,565 B2 * | 3/2006 | Park et al. ................. | 342/357.63 |
| 7,251,499 B2 * | 7/2007 | Ella et al. .................... | 455/552.1 |
| 7,280,810 B2 * | 10/2007 | Feher .............................. | 455/137 |
| 2005/0009482 A1 * | 1/2005 | Han ............................... | 455/133 |
| 2005/0119025 A1 * | 6/2005 | Mohindra et al. .......... | 455/552.1 |

* cited by examiner

*Primary Examiner* — Brenda H Pham
(74) *Attorney, Agent, or Firm* — Altis Law Group, Inc.

(57) ABSTRACT

An RF module for multimode-multiband communication includes an RF switch, a GPS communication module, a CDMA communication module, a GSM communication module, a WLAN communication module. The GPS communication module, the CDMA communication module, the GSM communication module and the WLAN communication module are connected the RF switch. The RF switch can switch among the GPS communication module, the CDMA communication module, the GSM communication module and the WLAN communication module to transmit/receive signals correspondingly.

13 Claims, 1 Drawing Sheet

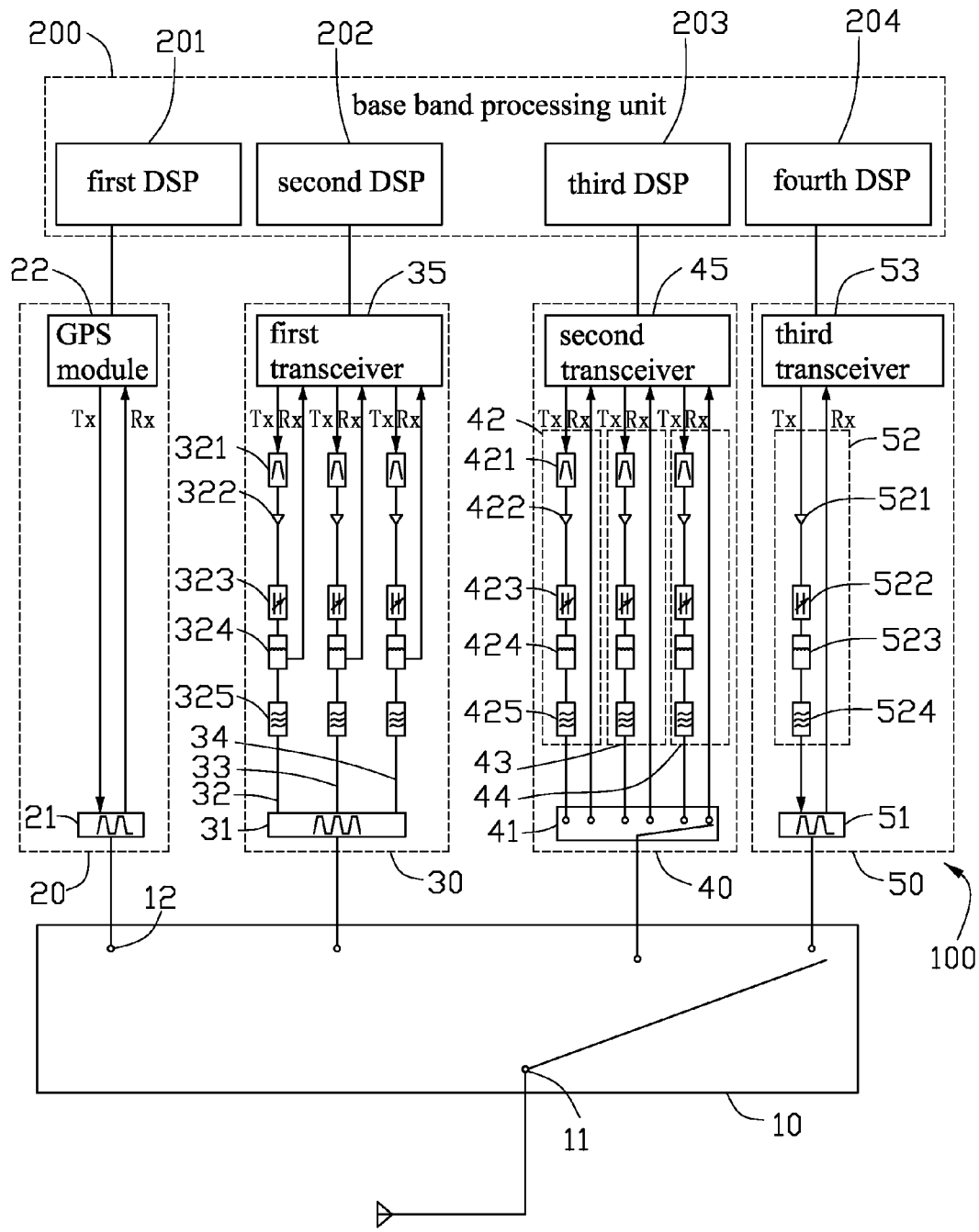

RADIO FREQUENCY MODULE AND WIRELESS COMMUNICATION DEVICE USING THE SAME

BACKGROUND

1. Technical Field

The disclosure generally relates to radio frequency (RF) modules and wireless communication devices using the same, particularly to an RF module and a wireless communication device using the same for multimode-multiband communication.

2. Description of Related Art

Since 1992, second generation communication systems, such as Global System for Mobile communication (GSM) system including frequency bands of GSM900, GSM1800 and GSM1900 have developed rapidly. However, second generation communication systems cannot satisfy the requirement of people for data transmission quality because of their low data transmission speed. Therefore, third generation communication systems, such as Code Division Multiple Access (CDMA) communication system including frequency band of Wideband Code Division Multiple Access (WCDMA) 2000, Personal Communications Service (PCS) 1900, and CDMA850 offering high speed data transmission and multimedia service were developed and put into service, and are anticipated to exist alongside second generation communication systems for a long time into the future.

What is needed, therefore, is an RF module and a wireless communication device which can support multimode-multiband communication, and switch among different frequency bands of different communication systems freely to realize the function of global roaming.

BRIEF DESCRIPTION OF THE DRAWINGS

Many aspects of the RF module and wireless communication device can be better understood with reference to the following drawing. The components in the drawings are not necessarily drawn to scale, the emphasis instead being placed upon clearly illustrating the principles of the RF module and wireless communication device.

The drawing is a block diagram of an RF module for a wireless communication device in accordance with a present embodiment.

DETAILED DESCRIPTION

Referring to the drawing, a wireless communication device (not labeled) supporting multimode-multiband communication includes an antenna (not labeled), an RF module 100, and a base band processing unit 200. The wireless communication device transmits/receives signals using any of the different frequency bands of Global Position System (GPS), CDMA, GSM, and Wireless Local Area Network (WLAN) communication systems from the antenna to the base band processing unit 200 via the RF module 100.

The RF module 100 includes an RF switch 10, a GPS communication module 20, a CDMA communication module 30, a GSM communication module 40, a WLAN communication module 50. The RF module 100 can switch among the GPS communication module 20, the CDMA communication module 30, the GSM communication module 40, and the WLAN communication module 50 via the RF switch 10, and support a wireless communication device to work in four communication modes of GPS, CDMA, GSM, and WLAN.

The RF switch 10 is a single-pole multi-throw switch. In this embodiment, the RF switch 10 is a single-pole four-throw (SP4T) switch including a first contact 11 and four second contacts 12. The first contact 11 is connected to an antenna of the wireless communication device. The four second contacts 12 are connected to the GPS communication module 20, the CDMA communication module 30, the GSM communication module 40, and the WLAN communication module 50 respectively. The RF switch 10 switches among the GPS communication module 20, the CDMA communication module 30, the GSM communication module 40, and the WLAN communication module 50 by connecting the first contact 11 to one of the four second contacts 12.

The GPS communication module 20 includes a first duplexer 21 and a GPS module 22 electronically connected to the first duplexer 21. The first duplexer 21 can be connected to the antenna via the RF switch 10. The GPS module 22 is connected to the base band processing unit 200. When the RF switch 10 switches to the GPS communication mode, the GPS communication module 20 works as follows: the first duplexer 21 obtains GPS signals from or sends GPS signals to the antenna, and sends received GPS signals to the base band processing unit 200 via the GPS module 22.

The CDMA communication module 30 includes a triplexer 31, a WCDMA2100 communication link 32, a PCS1900 communication link 33, a CDMA850 communication link 34 and a first transceiver 35. The triplexer 31 can be connected to the antenna via the RF switch 10 to send the signals received from the antenna to the first transceiver 35. The WCDMA2100 communication link 32, the PCS1900 communication link 33, and the CDMA850 communication link 34 are set between the triplexer 31 and the first transceiver 35 to transmit/receive signals of frequency bands of WCDMA2100, PCS1900, and CDMA850. The first transceiver 35 is connected to the base band processing unit 200 to send the signals received from the WCDMA2100 communication link 32, the PCS1900 communication link 33, and the CDMA850 communication link 34 to the base band processing unit 200.

The WCDMA2100 communication link 32 includes a WCDMA2100 transmitting link Tx and a WCDMA2100 receiving link Rx. The WCDMA2100 transmitting link Tx and a WCDMA2100 receiving link Rx are set between the triplexer 31 and the first transceiver 35 to transmit/receive WCDMA2100 signals. The WCDMA2100 transmitting link Tx includes a first simplex 321, a first low noise amplifier (LNA) 322, a first variable capacitor 323, a first variable inductor 324 and a surface acoustic wave (SAW) filter 325 electronically connected in series. The first simplex 321 is configured for transmitting signals. The first LNA 322 is configured for amplifying the signals. The variable capacitor 323, the first variable inductor 324 and the first SAW filter 325 are configured for adjusting the signals. The WCDMA2100 receiving link Rx is formed by connecting the first variable inductor 324 to the first transceiver 35 directly.

In addition, the structures of the PCS1900 communication link 33 and the CDMA850 communication link 34 are substantially similar to the WCDMA2100 communication link 32, so are not detailed here.

The GSM communication module 40 includes a transmitting/receiving switch 41, a GSM1900 communication link 42, a GSM800 communication link 43, and an EGSM900 communication link 44 and a second transceiver 45. The transmitting/receiving switch 41 can be connected to the antenna via the RF switch 10 to switch among the three frequency bands of GSM1900, GSM800, and EGSM900. The GSM1900 communication link 42, the GSM800 communication link 43, and the EGSM900 communication link 44 are set between the transmitting/receiving switch 41 and the second transceiver 45 to transmit/receive signals of the three frequency bands of GSM1900, GSM800, and EGSM900 to the second transceiver 45. The second transceiver 45 is connected to the base band processing unit 200 to send the signals received from the GSM1900 communication link 42, the GSM800 communication link 43, and the EGSM900 communication link 44 to the base band processing unit 200.

The GSM1900 communication link 42 includes a GSM1900 transmitting link Tx and a GSM1900 receiving link Rx. The GSM1900 transmitting link Tx and the GSM1900 receiving link Rx are set between the transmitting/receiving switch 41 and the second transceiver 45 to transmit/receive GSM1900 signals. The GSM transmitting link Tx includes a second simplex 421, a second LNA 422, a second variable capacitor 423, a second variable inductor 424 and the second SAW filter 425. The second simplex 421 is configured for transmitting signals. The second LNA 422 is configured for amplifying the signals. The second variable capacitor 423, the second variable inductor 424 and the second SAW filter 425 are configured for adjusting the signals. The GSM1900 receiving link Rx is formed by connecting the transmitting/receiving switch 41 to the second transceiver 45 directly.

In addition, the structures of GSM800 communication link 43 and EGSM900 communication link 44 are substantially similar to the GSM1900 communication link 42, so not detailed here.

The WLAN communication module 50 includes a second duplexer 51, a WLAN communication link 52, and a third transceiver 53 electronically connected in series. When the RF switch 10 is connected to the WLAN communication module 50, it works as follows: the second duplexer 51 obtains WLAN signals from the antenna, and obtains WLAN signals from or sends the WLAN signals to the transceiver 53 via the WLAN communication link 52, then the transceiver 53 sends the WLAN signals to the base band processing unit 200.

The WLAN communication link 52 includes a WLAN transmitting link Tx and a WLAN receiving link Rx. The WLAN transmitting link Tx and the WLAN receiving link Rx are set between the second duplexer 51 and the third transceiver 53 to transmit/receive WLAN signals. The WLAN transmitting link Tx includes a third LNA 521, a third variable capacitor 522, a third variable inductor 523 and a third SAW filter 524 electronically connected in series. The third LNA 521 is configured for amplifying signals. The third variable capacitor 522, the third variable inductor 523 and the third SAW filter 524 are configured for adjusting the signals. The LNA receiving link Rx is formed by connecting the second duplexer 51 to the third transceiver 53 directly.

The base band processing unit 200 includes a first DSP 201, a second DSP 202, a third DSP 203 and a fourth DSP 204 connected to the GPS module 22, the first transceiver 35, the second transceiver 45 and the third transceiver 53 respectively to process the corresponding signals received from the GPS module 22, the first transceiver 35, the second transceiver 45, and the third transceiver 53.

The wireless communication device transmits/receives signals at different frequency bands of GPS, CDMA, GSM, and WLAN communication systems by switching the RF switch 10 among the GPS communication module 20, the CDMA communication module 30, the GSM communication module 40, and the WLAN communication module 50, and realizes multimode-multiband communication freely.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An RF module for multimode-multiband communication, comprising:
   an RF switch;
   a GPS communication module;
   a CDMA communication module;
   a GSM communication module; and
   a WLAN communication module; wherein the GPS communication module, the CDMA communication module, the GSM communication module and the WLAN communication module are connected to the RF switch is configured to switch among the GPS communication module, the CDMA communication module, the GSM communication module and the WLAN communication module to transmit/receive signals correspondingly;
   wherein the CDMA communication module includes a triplexer, a WCDMA2100 communication link, a PCS1900 communication link, a CDMA850 communication link and a first transceiver, the WCDMA2100 communication link, the PCS1900 communication link and the CDMA850 communication link are set between the triplexer and the first transceiver, the triplexer receives the signals of frequency band of WCDMA2100, PCS1900, and CDMA850, and transmits the signals to the first transceiver via the WCDMA2100 communication link, the PCS1900 communication link, and the CDMA850 communication link correspondingly.

2. The RF module as claimed in claim 1, wherein the GPS communication module includes a first duplexer and a GPS module connected to the first duplexer electronically to transmit/receive GPS signals.

3. The RF module as claimed in claim 1, wherein the GSM communication module includes a transmitting/receiving switch, a GSM1900 communication link, a GSM800 communication link, an EGSM900 communication link and a second transceiver, the GSM1900 communication link, the GSM800 communication link, and the EGSM900 communication link are set between the transmitting/receiving switch and the second transceiver to transmit signals of the three frequency bands of GSM1900, GSM800, and EGSM900 to the second transceiver.

4. The RF module as claimed in claim 1, wherein the WLAN communication module includes a second duplexer, a WLAN communication link, and a third transceiver electronically connected in series, the second duplexer obtains WLAN signals, and sends the WLAN signals to the transceiver via the WLAN communication link.

5. A wireless communication device comprising:
   an antenna;
   an RF module comprising:
   an RF switch;
   a GPS communication module;
   a CDMA communication module;
   a GSM communication module;
   a WLAN communication module; and
   a base band processing unit; wherein the GPS communication module, the CDMA communication module, the GSM communication module and the WLAN communication module are set between the RF switch and the base band processing unit, the RF switch is configured to switch among the GPS communication module, the CDMA communication module, the GSM communication module and the WLAN communication module to transmit/receive signals from the antenna correspondingly, the base band processing unit processes signals received from GPS communication module, the CDMA communication module, the GSM communication module and the WLAN communication module;

wherein the WLAN communication module includes a second duplexer, a WLAN communication link, and a third transceiver electronically connected in series, the second duplexer is connected to the antenna, the second duplexer obtains WLAN signals from the antenna, and sends the WLAN signals to the transceiver via the WLAN communication link, then the transceiver sends the WLAN signals to the base band processing unit.

6. The wireless communication device as claimed in claim 5, wherein the GPS communication module includes a first duplexer and a GPS module connected to the first duplexer electronically, the first duplexer is connected to the antenna, the GPS module is connected to the base band processing unit, the first duplexer receives a GPS signals from the antenna, and sends the GPS signals to the base band processing unit via GPS module.

7. The wireless communication device as claimed in claim 5, wherein the CDMA communication module includes a triplexer, a WCDMA2100 communication link, a PCS1900 communication link, a CDMA850 communication link and a first transceiver, the triplexer is connected to the antenna, the WCDMA2100 communication link, PCS1900 communication link and CDMA850 communication link are set between the triplexer and the first transceiver, the first transceiver is connected to the base band processing unit, the triplexer receives the signals of frequency band of WCDMA2100, PCS1900, and CDMA850 from the antenna, and transmits the signals to the first transceiver via the WCDMA2100 communication link, the PCS1900 communication link, and the CDMA850 communication link correspondingly, the first transceiver sends the signals received from the WCDMA2100 communication link, the PCS1900 communication link, and the CDMA850 communication link to the base band processing unit.

8. The wireless communication device as claimed in claim 5, wherein the GSM communication module includes a transmitting/receiving switch, a GSM1900 communication link, a GSM800 communication link, an EGSM900 communication link and a second transceiver, the transmitting/receiving switch is connected to the antenna to receive signals of the three frequency bands of GSM1900, GSM800, and EGSM900 from the antenna, the GSM1900 communication link, the GSM800 communication link, and the EGSM900 communication link are set between the transmitting/receiving switch and the second transceiver to transmit the signals to the second transceiver, the second transceiver is connected to the base band processing unit to send the signals received from the GSM1900 communication link, the GSM800 communication link, and the EGSM900 communication link to the base band processing unit.

9. The wireless communication device as claimed in claim 5, wherein The base band processing unit includes a first DSP, a second DSP, a third DSP and a fourth DSP connected to the a GPS communication module, the CDMA communication module, the GSM communication module, and the WLAN communication module separately to process signals received from them.

10. An RF module for multimode-multiband communication, comprising:
 an RF switch;
 a GPS communication module;
 a CDMA communication module;
 a GSM communication module; and
 a WLAN communication module; wherein the GPS communication module, the CDMA communication module, the GSM communication module and the WLAN communication module are connected to the RF switch, the RF switch is configured to switch among the GPS communication module, the CDMA communication module, the GSM communication module and the WLAN communication module to transmit/receive signals correspondingly;
 the GSM communication module includes a transmitting/receiving switch, a GSM1900 communication link, a GSM800 communication link, an EGSM900 communication link and a second transceiver, the GSM1900 communication link, the GSM800 communication link, and the EGSM900 communication link are set between the transmitting/receiving switch and the second transceiver to transmit signals of the three frequency bands of GSM1900, GSM800, and EGSM900 to the second transceiver.

11. The RF module as claimed in claim 10, wherein the GPS communication module includes a first duplexer and a GPS module connected to the first duplexer electronically to transmit/receive GPS signals.

12. The RF module as claimed in claim 10, wherein the CDMA communication module includes a triplexer, a WCDMA2100 communication link, a PCS1900 communication link, a CDMA850 communication link and a first transceiver, the WCDMA2100 communication link, the PCS1900 communication link and the CDMA850 communication link are set between the triplexer and the first transceiver, the triplexer receives the signals of frequency band of WCDMA2100, PCS1900, and CDMA850, and transmits the signals to the first transceiver via the WCDMA2100 communication link, the PCS1900 communication link, and the CDMA850 communication link correspondingly.

13. The RF module as claimed in claim 10, wherein the WLAN communication module includes a second duplexer, a WLAN communication link, and a third transceiver electronically connected in series, the second duplexer obtains WLAN signals, and sends the WLAN signals to the transceiver via the WLAN communication link.

* * * * *